A. G. ELVIN.
JOINT FOR METALLIC CONDUITS.
APPLICATION FILED NOV. 17, 1910.

998,884.                                    Patented July 25, 1911.

WITNESSES
James C. Herron
S. R. Bell

INVENTOR
Albert G. Elvin
by Howden Bell, atty.

UNITED STATES PATENT OFFICE.

ALBERT G. ELVIN, OF EAST ORANGE, NEW JERSEY.

JOINT FOR METALLIC CONDUITS.

998,884.

Specification of Letters Patent. Patented July 25, 1911.

Original application filed July 1, 1910, Serial No. 569,853. Divided and this application filed November 17, 1910. Serial No. 592,808.

*To all whom it may concern:*

Be it known that I, ALBERT G. ELVIN, of East Orange, in the county of Essex and State of New Jersey, have invented a certain new and useful Improvement in Joints for Metallic Conduits, of which improvement the following is a specification.

My present invention relates to joints for metallic conduits of the type set forth in an application for Letters Patent filed by me under date of July 1, 1910, Ser. No. 569,853, of which application this is a division, and its object is to provide a joint desirably adapted for the operation of metallic conduits of such type.

The improvement claimed is hereinafter fully set forth.

Figure 1:
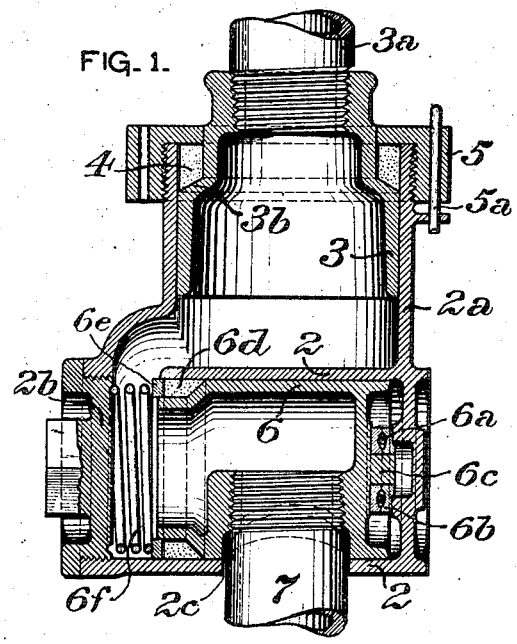
Figure 2:
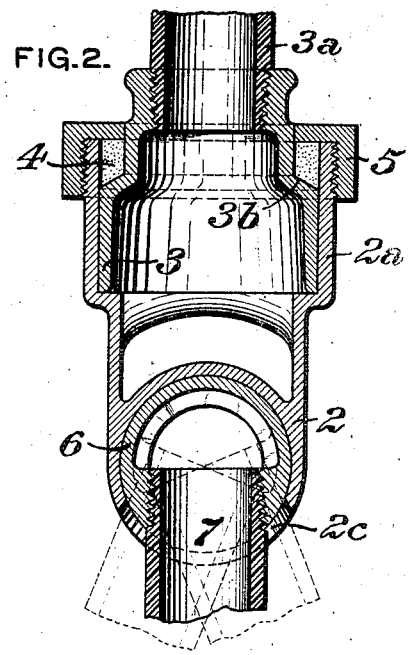
Figure 3:
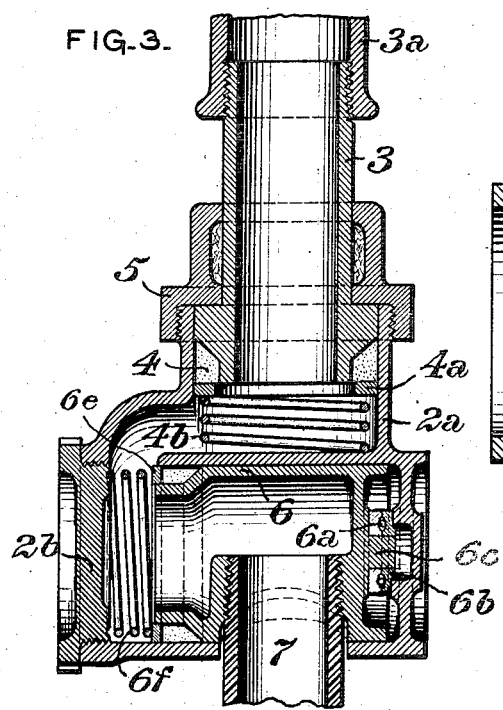

In the accompanying drawings: Figure 1 is a vertical longitudinal central section through a joint for metallic conduits, illustrating an embodiment of my invention; Fig. 2, a similar section, taken at right angles to Fig. 1; Fig. 3, a section, similar to Fig. 1, illustrating a structural modification of the joint body; and, Fig. 4, a longitudinal central section through the joint sleeve, detached.

The function of my present invention is to provide, in a metallic conduit of the type set forth in my application, Ser. No. 569,853 aforesaid, a double joint which will permit movement of two connected pipe sections about axes at right angles one to the other, without leakage of fluid or undue friction of the articulated members. To this end, a pipe section, $3^a$, which may be either straight or in elbow form, is connected with another pipe section, 7, through the intermediation of a joint, comprising as essential elements, a sleeve, 3, rigidly connected to the pipe section, $3^a$, a joint body, 2, connected to the sleeve, 3, with the capacity of movement about the axis thereof, and a joint sleeve, 6, which is connected to the joint body, with the capacity of movement about the axis thereof, said axis being at right angles to the axis of the sleeve, 3, and which is rigidly connected to the pipe section, 7.

Figure 4:
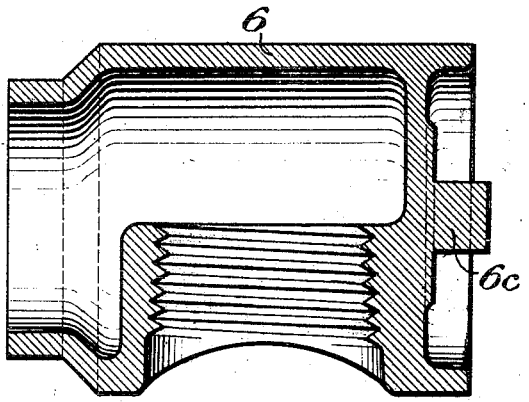

Referring first to Figs. 1, 2, and 4, the sleeve, 3, is enlarged in diameter beyond the pipe section, $3^a$, to provide a tapered peripheral seat, $3^b$, for a gasket, 4, of suitable packing material. A tubular extension or neck, $2^a$, is formed on the top of the joint body, 2, its internal diameter being such as to enable it to fit neatly around the sleeve, 3, and around the gasket, 4, of said sleeve. The neck, $2^a$, is externally threaded to engage a nut, 5, which fits over, and bears on, the top of the gasket, 4, and fits freely around the sleeve, 3, above the neck, $2^a$. The nut, 5, may be locked in position, when brought to a proper bearing on the neck, $2^a$, by a split pin, $5^a$, passing through a lug on the neck, $2^a$. The joint body and the members connected thereto, are held by their own gravity to a bearing on the gasket, 4, and the joint body is free to turn about the common axis of the pipe section, $3^a$, and the neck, $2^a$, of the joint body.

The lower portion of the joint body, 2, is bored out, at right angles to the axis of the neck, $2^a$, to receive a joint sleeve, 6, which is inserted through an opening in one end of the joint body, closed by a removable cap, $2^b$, and is fitted to turn freely in the bore of the joint body. The pipe section, 7, is passed through a transverse sectoral slot, $2^c$, in the joint body, and screwed into the joint sleeve, 6, after the insertion of the latter in position in the joint body. There is thus provided a double joint, as the pipe section, 7, is afforded the capacity of two motions, one being about the axis of the fixed sleeve, 3, and the other through the slot, $2^c$, about an axis at right angles thereto, *i. e.*, the axis of the movable joint sleeve, 6, as indicated in dotted lines in Fig. 2.

In order to minimize end friction, the joint sleeve, 6, preferably abuts against the closed end of the joint body, 2, through the interposition of ball bearings, $6^a$, carried in a ball race, $6^b$, which fits on a central hub, $6^c$, on the adjacent end of the joint sleeve, 6, and is held in position by riveting over the end of the hub, $6^c$. A packing gasket, $6^d$, is fitted between the joint sleeve, 6, and the joint body, 2, at the opposite end of the sleeve, with a follower ring, $6^e$, on its outer side, and a spring, $6^f$, which abuts against the follower ring and the cap, $2^b$, holds the sleeve solidly in the joint body, when running without pressure, and prevents rattling and undue wear. The ball race acts as a thrust bearing and eliminates about 90 per cent. of the friction which would be encountered with plain bearings.

Fig. 3 illustrates a structural modification in the disposition of the packing gasket, 4, relatively to the fixed sleeve, 3. The gasket, is, in this case, placed below, instead of above, a shoulder on the sleeve, 3, and is held in position by a follower ring, 4ª, and spring, 4ᵇ. The nut, 5, engages an external thread on the neck, 2ª, of the joint body, as in the instance first described, but bears on the top of a shoulder on the sleeve, 3, instead of on the gasket, 4. Under this construction, the gasket may be removed and another inserted when desired, without detaching the sleeve, 3, from the pipe section, 3ª, as would be necessary when the construction first described is employed.

I claim as my invention and desire to secure my Letters Patent:

1. In a joint for metallic conduits, the combination of a sleeve adapted to be rigidly connected to a pipe section, a joint body fitted on and adapted to rotate about the axis of said sleeve, a nut engaging an external thread on the joint body and bearing on the sleeve, a packing gasket interposed between the sleeve and nut, and fitting a tapered peripheral seat on the sleeve, a joint sleeve fitted in the joint body and adapted to rotate about an axis at right angles to the axis of the sleeve first specified, and to be rigidly connected to a pipe section, and a packing gasket interposed between the joint body and joint sleeve.

2. In a joint for metallic conduits, the combination of a sleeve adapted to be rigidly connected to a pipe section, a joint body fitted on and adapted to rotate about the axis of said sleeve, and having a portion with an axis at right angles thereto, said joint body being provided with a transverse sectoral slot, and a joint sleeve having an imperforate wall and an open end and fitted in the joint body and adapted to rotate about the axis thereof and to be connected with a pipe section through the transverse sectoral slot of the joint body.

3. A joint sleeve for jointed metallic conduits, having a body which is closed at one end and bored out to receive a joint sleeve, a neck projecting at right angles to its body, said neck being bored out to fit over a pipe line section sleeve and exteriorly threaded for a nut, and a transverse sectoral slot formed in its body, and a joint sleeve having an imperforate wall and an open end and fitted in the joint body and adapted to rotate about the axis thereof and to be connected with a pipe section through the transverse sectoral slot of the joint body.

4. A joint sleeve for jointed metallic conduits, having a cylindrical body which is closed at one end and open at the other, finished exteriorly to fit within a joint body, provided with a central hub projecting from its closed end to receive a ball race and with a seat adjoining its open end for a packing gasket, and having an in ally threaded lateral opening for the attachment of a pipe section.

ALBERT G. ELVIN.

Witnesses:
F. W. Martin,
C. L. Winey.